F. S. ELLETT.
CLUTCH.
APPLICATION FILED FEB. 16, 1911.
1,045,688.
Patented Nov. 26, 1912.
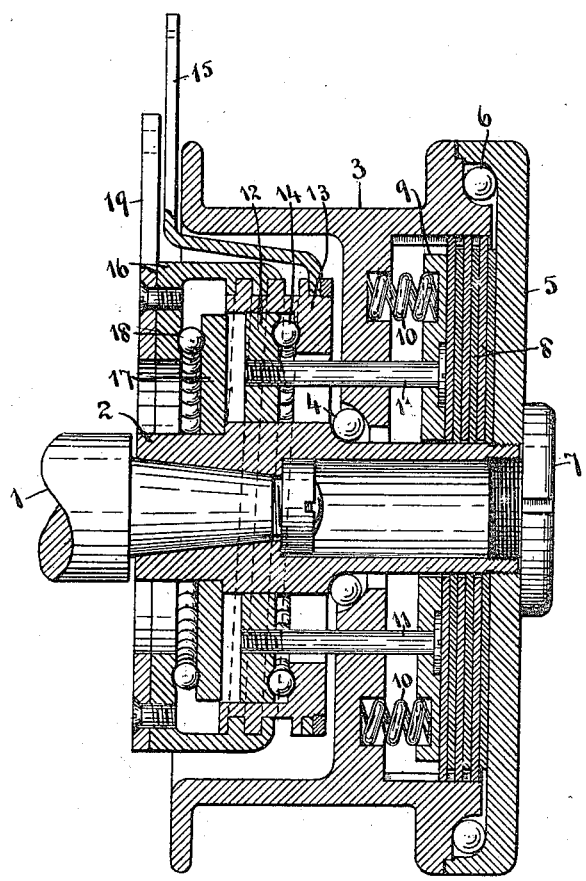
WITNESSES:
INVENTOR
Frederick S. Ellett
BY
Eugene Diven
ATTORNEY

UNITED STATES PATENT OFFICE.

FREDERICK S. ELLETT, OF ELMIRA, NEW YORK.

CLUTCH.

1,045,688.  Specification of Letters Patent.  Patented Nov. 26, 1912.

Application filed February 16, 1911. Serial No. 609,016.

*To all whom it may concern:*

Be it known that I, FREDERICK S. ELLETT, a citizen of the United States, residing at Elmira, in the county of Chemung and State of New York, have invented certain new and useful Improvements in Clutches, of which the following is a specification.

This invention relates more particularly to improvements in clutches for motorcycles, whereby the driving pulley is thrown into and out of engagement with the engine or other driving shaft, and constitutes a modification of the clutch described in my copending application filed of even date herewith, my object being to provide a simple and effective clutch for this purpose which may be controlled from the handle bar of the machine, and which will take up the load gradually when throwing in the clutch, the operating parts being so arranged as to avoid end thrust on the shaft in either direction.

I attain my object, in the present instance, by constructing the parts of the clutch and operating mechanism in the manner illustrated in the accompanying drawing, wherein I have shown a longitudinal sectional view of the clutch as attached to the end of an engine or other driving shaft.

As illustrated, I have shown the end of a shaft 1, with the hub 2 secured thereon. The hub may, however, be formed integrally upon the end of the shaft. Rotatably mounted upon the hub, by means of the ball bearing 4, is a belt pulley, or other driving wheel, 3, provided with an interior web or disk 3′ which I have shown as formed integral with the rim of the wheel. At its outward side the pulley is chambered, and a cap piece 5 is screwed upon the end of the hub with a bearing 6 between it and the rim of the pulley, said cap being held in position to properly adjust the bearings 4 and 6 by means of a cap screw 7, which screws into a central bore in the end of the hub. In the chamber of the pulley, a plurality of friction disks 8 are placed in alternate engagement with the pulley and the hub, although I do not confine myself to this particular form of the clutch members. A setting up disk 9 is pressed outwardly against the clutch members by means of a plurality of springs 10, suitably disposed around the clutch between said disk and the web or disk 3′. Bolts 11 pass from the disk 9 through holes in the pulley web, to a disk 12, slidably mounted upon the hub. This disk is positioned inside a cam member, here shown as an externally screw threaded ring 13, provided with an inturned flange between which and the disk is a ball bearing 14. The ring 13 is provided with an arm 15, by which it may be turned when the clutch is to be released. This movable cam member has engagement with a fixed or non-revoluble cam member; in this instance an internally screw threaded ring 16, provided with an inturned flange, between which and a disk 17, fastened against outward movement on the hub 2, is a ball bearing 18. The ring 16 is held against rotative movement by means of an arm 19, adapted to be fastened to the engine casing or other fixed support.

To operate the clutch to release the wheel 3, the ring 13 is turned by means of the arm 15 in a direction to screw it inward on the ring 16, thereby moving the disk 12 inward and drawing the disk 9 away from gripping engagement with the disks 8, by means of the bolts 11. When the arm 15 is released, the springs 10 will act to gain force the disk 9 against the disks 8, the ring 13 being turned backward by reason of the outward pull of the disk 9. The rings 16 and 13, except when 13 is turned to adjust the clutch, will both remain stationary, the disks 12 and 17 rotating with the wheel on the bearings 14 and 18 when the wheel is in rotative engagement with the hub. In screwing the ring 13 into the ring 16 the thrust will be taken up by the two bearings 14 and 18, and transmitted to the hub 2 through the disk 17. The outward thrust of the springs against the clutch members will be transmitted to the cap piece 5, and thence to the end of the hub, so that in either direction there will be no thrust transmitted to the shaft in its bearings.

While I have shown this clutch provided with a driving wheel for a broad belt, I do not confine myself to this particular form of wheel; nor to any of the specific details in the construction of the operating mechanism. The shaft may be fastened to the other end of the hub, thereby placing the operating parts at the outward end of the hub. Moreover, the cam ring 16 might be fastened directly to the engine casing around the shaft, and the thrust bearing 17—18 omitted. This, however, would place an end thrust on the shaft, which it is my aim to avoid.

What I claim as my invention, and desire to secure by Letters Patent is—

1. The combination with a rotary shaft having a hub at one end thereof, of a concentric wheel mounted for free rotation on the hub, clutch members between the wheel and hub, a non-revoluble cam member mounted upon an outward thrust bearing at the inward end of the hub, a revoluble cam member in engagement with said non-revoluble member, a longitudinally movable member revolubly mounted on the hub between which member and the revoluble cam member there is an inward thrust bearing, and means connecting said longitudinally movable member to one of the clutch members.

2. The combination with a rotary shaft having a hub at one end thereof, of a concentric wheel mounted for free rotation on the hub, clutch members between the wheel and hub, a non-revoluble cam member mounted upon an outward thrust bearing at the inward end of the hub, a revoluble cam member in engagement with said non-revoluble member, a longitudinally movable member revolubly mounted on the hub between which member and the revoluble cam member there is an inward thrust bearing, and bolts passing freely through the web of the wheel from the longitudinally movable member, whereby said member is attached to one of the clutch members.

3. The combination with a rotary shaft having a hub at one end thereof, of a concentric wheel mounted for free rotation on the hub, clutch members between the wheel and hub, a non-revoluble ring having internal cam surfaces formed thereon mounted upon an outward thrust bearing at the inward end of the hub, a revoluble ring having external cam surfaces in engagement with the non-revoluble ring, a disk inside the revoluble ring freely mounted upon the hub and susceptible of longitudinal movement thereon, a thrust bearing between the disk and an inturned flange on the outward side of the revoluble ring, and means connecting the disk to one of the clutch members.

4. The combination with a rotary shaft having a hub at one end thereof, of a concentric wheel having a web mounted for free rotation on the hub and a chamber at the outward side of the web, a cap piece fastened upon the outward end of the hub to close said chamber, a bearing between the wheel and the cap piece around the chamber, clutch members in the chamber between the wheel and cap piece, and means mounted on the hub at the inward side of the wheel and connected through the web to one of the clutch members for actuating said members.

5. The combination with a rotary shaft having a hub at one end thereof, of a concentric wheel having a web mounted for free rotation on the hub and a chamber at the outward side of the web, a cap piece fastened upon the outward end of the hub to close said chamber, a bearing between the wheel and the cap piece around the chamber, clutch members in the chamber between the wheel and cap piece, one or more springs between the web and the inward clutch member, and means at the inward side of the wheel and connected through the web to said clutch member for drawing said member inward to release the clutch.

6. A clutch comprising a rotary member, a wheel rotatably mounted on said member, clutch members adapted to connect said wheel and said member, a non-revoluble cam member at one end of said rotary member, a revoluble cam member in engagement with said non-revoluble cam member, a longitudinally movable member rotatably mounted on said rotary member and engaging said revoluble cam member, and means connecting said longitudinally movable member and one of said clutch members and adapted to move the clutch member longitudinally.

7. A clutch comprising a rotary member, a wheel rotatably mounted on said member and comprising an interior disk having a concentric opening at its center, a bearing between the inner edge of said disk and said rotary member, an axially extending concentric flange on said wheel and forming a chamber therein, an annular friction disk within said chamber and carried by said flange, friction disks carried by said rotary member and adapted to engage said annular friction disk, an end plate closing the open side of said chamber and forming a part of said rotary member, means co-acting with said end plate and said wheel for normally holding said friction disks in engagement, means for releasing said friction disks and including a non-revoluble cam member, and a revoluble cam member in engagement with the non-revoluble cam member and connections between one of said cam members and one of the friction disks.

8. A clutch comprising a rotary member, a wheel rotatably mounted on said member and comprising an interior disk having a concentric opening at its center, a bearing between the inner edge of said disk and said rotary member, a chamber in said wheel on one side of said web, friction disks in said chamber and carried by said wheel, other friction disks engaging said first-mentioned disks and carried by said rotary member, an end plate forming a part of said rotary member and closing said chamber, a plurality of springs coacting with said end plate and said wheel, a non-revoluble threaded ring, a revoluble threaded ring, the threads of said rings being in engagement, an axially movable member, means connecting said axially movable member and one of said friction disks and engaging said web, a thrust bearing between said revoluble ring and said axially movable member, and a thrust bearing between said non-revoluble ring and said rotary member.

9. In a clutch, the combination of a rotary member, a wheel rotatably mounted on said rotary member and comprising an outer rim portion and an interior disk, friction members between said wheel and said rotary member, an axially movable disk carried by said wheel and engaging one of said friction members, a third disk arranged on the opposite side of said interior disk from said movable disk and connected with the latter, a spring arranged between two of said disks and adapted to normally hold said friction members in gripping engagement, and means, comprising a revoluble cam member, a non-revoluble cam member and a thrust bearing between one of said cam members and said third disk, for withdrawing said movable disk from said friction members.

10. In a clutch, the combination of a rotary member, a wheel rotatably mounted on said rotary member and comprising an outer rim portion and an interior disk, friction members between said wheel and said rotary member, an axially movable disk carried by said wheel, a third disk arranged on the opposite side of said interior disk from said movable disk, a spring arranged between two of said disks and adapted to normally hold said friction members in gripping engagement, a longitudinally arranged member connecting said movable disk and said third disk, and revoluble cam means connected with said third disk for moving the same.

11. In a clutch, the combination of a rotary member, a wheel rotatably mounted on said rotary member and comprising an outer rim portion and an interior disk, friction members between said wheel and said rotary member, an axially movable disk carried by said wheel, a third disk arranged on the opposite side of said interior disk from said movable disk, a plurality of springs arranged between said interior disk and said movable disk and adapted to normally hold said friction members in gripping engagement, a longitudinally arranged member connecting said movable disk and said third disk, and revoluble cam means connected with said third disk and adapted to move the same to simultaneously compress all of said springs.

12. In a clutch, the combination of a rotary member, a wheel rotatably mounted on said rotary member and comprising an outer rim portion and an interior disk having a plurality of recesses in one side thereof, friction members between said wheel and said rotary member, a second disk carried by said wheel and having a plurality of recesses in alinement with the recesses in said interior disk, springs arranged in said recesses and adapted to normally hold said friction members in gripping engagement, and means, comprising a disk connected with said second disk by longitudinally arranged members extending through said interior disk, a revoluble cam member and a non-revoluble cam member, for moving said connected disks so as to simultaneously actuate all of said springs.

In testimony whereof I have affixed my signature, in presence of two witnesses.

FREDERICK S. ELLETT.

Witnesses:
M. E. VERBECK,
EUGENE DIVEN.

Copies of this patent may be obtained for five cents each, by addressing the "Commissioner of Patents, Washington, D. C."